United States Patent [19]

Janssens et al.

[11] Patent Number: 5,476,746
[45] Date of Patent: Dec. 19, 1995

[54] BLACK COLORED DYE MIXTURE FOR USE ACCORDING TO THERMAL DYE SUBLIMATION TRANSFER

[75] Inventors: Wilhelmus Janssens, Aarschot; Raymond Roosen, 's-Gravenwezel; Modest Vereycken, Borsbeek, all of Belgium

[73] Assignee: AGFA-Gevaert, N.V., Mortsel, Belgium

[21] Appl. No.: 75,101

[22] Filed: Jun. 11, 1993

[30] Foreign Application Priority Data

| Jul. 14, 1992 | [EP] | European Pat. Off. | 92202156 |
| Jul. 14, 1992 | [EP] | European Pat. Off. | 92202157 |
| Oct. 13, 1992 | [EP] | European Pat. Off. | 92203137 |

[51] Int. Cl.⁶ .................................................. B41M 5/38
[52] U.S. Cl. .............................. 430/200; 430/201; 8/471; 503/227
[58] Field of Search ................ 503/227; 430/200, 430/201; 8/471; 534/850, 856

[56] References Cited

U.S. PATENT DOCUMENTS

| 2,762,810 | 9/1956 | Heckert | 546/166 |
| 2,853,483 | 9/1958 | Rhyner | 534/856 |
| 4,212,642 | 7/1980 | Della Casa et al. | 8/471 |
| 4,614,521 | 9/1986 | Niwa et al. | 430/201 |
| 4,700,207 | 10/1987 | Vanier et al. | 430/945 |
| 4,816,435 | 3/1989 | Murata et al. | 428/914 |
| 4,988,665 | 1/1991 | Weber et al. | 430/201 |
| 5,091,360 | 2/1992 | Gemmell et al. | 8/471 |
| 5,122,499 | 6/1992 | Janssens et al. | 503/227 |
| 5,169,828 | 12/1992 | Janssens et al. | 428/914 |
| 5,221,658 | 6/1993 | Bach et al. | 503/227 |
| 5,229,353 | 7/1993 | Vanmaele et al. | 430/200 |
| 5,234,888 | 8/1993 | Defieuw et al. | 503/227 |
| 5,246,908 | 9/1993 | Janssens et al. | 503/227 |
| 5,286,706 | 2/1994 | Mochizuki et al. | 503/227 |
| 5,292,714 | 3/1994 | Kawakami et al. | 503/227 |
| 5,308,825 | 5/1994 | Defieuw | 503/227 |
| 5,366,951 | 11/1994 | Vanmaele | 503/227 |

FOREIGN PATENT DOCUMENTS

| 0966779 | 10/1950 | France | 534/856 |
| 0088013 | 7/1896 | Germany | 534/856 |

OTHER PUBLICATIONS

Hackh's Chemical Dictionary (1972) p. 99.

*Primary Examiner*—Charles L. Bowers, Jr.
*Assistant Examiner*—Martin J. Angebranndt
*Attorney, Agent, or Firm*—Breiner & Breiner

[57] ABSTRACT

Black colored dye mixture for use in thermal dye sublimation transfer composed of at least four dyes and comprising two dyes having absorption maxima in the spectral range between 470 and 600 nm that are at least 30 nm apart from each other.

13 Claims, No Drawings

BLACK COLORED DYE MIXTURE FOR USE ACCORDING TO THERMAL DYE SUBLIMATION TRANSFER

DESCRIPTION

FIELD OF THE INVENTION

The present invention relates to black colored dye mixtures and in particular to black colored dye mixtures for use in thermal dye sublimation transfer printing.

BACKGROUND OF THE INVENTION

Thermal dye sublimation transfer also called thermal dye diffusion transfer is a recording method in which a dye-donor element provided with a dye layer containing sublimating dyes having heat transferability is brought into contact with a receiver sheet and selectively, in accordance with a pattern information signal, heated with a thermal printing head provided with a plurality of juxtaposed heat-generating resistors, whereby dye from the selectively heated regions of the dye-donor element is transferred to the receiver sheet and forms a pattern thereon, the shape and density of which is in accordance with the pattern and intensity of heat applied to the dye-donor element.

A dye-donor element for use according to thermal dye sublimation transfer usually comprises a very thin support e.g. a polyester support, one side of which is covered with a dye layer, which contains the printing dyes. Usually an adhesive or subbing layer is provided between the support and the dye layer. Normally the opposite side is covered with a slipping layer that provides a lubricated surface against which the thermal printing head can pass without suffering abrasion. An adhesive layer may be provided between the support and the slipping layer.

A dye-image receiving element for use according to thermal dye sublimation transfer usually comprises a support, e.g. paper or a transparent film, coated with a dye-image receiving layer, into which the dye can diffuse more readily. An adhesive layer may be provided between the support and the receiving layer. A release agent may be contained in the receiving layer or in a separate layer on top of said receiving layer to improve the releasability of the receiving element from the donor element after transfer is effected.

The dye layer can be a monochrome dye layer or it may comprise sequential repeating areas of different colored dyes like e.g. of cyan, magenta and yellow hue. When a dye-donor element containing three or more primary colored dye areas is used, a multicolor image can be obtained by sequentially performing the dye transfer process steps for each color area.

Black colored images are obtained by thermal dye sublimation transfer printing either by sequentially performing the dye transfer process steps for the three primary colors cyan, magenta and yellow using a dye-donor element comprising sequential repeating areas of cyan, magenta and yellow colored dyes or by performing only one transfer step using a dye-donor element having a black colored dye layer containing a mixture of yellow, magenta and cyan colored image dyes. The latter of these two methods is preferred due to i.a. ease of manufacturing the donor element containing only one dye area, less time consuming recording with only one transfer step and avoiding the problem of transfer in register of the respective dyes in the respective dye areas. Mixtures of yellow, magenta and cyan dyes for the formation of a black colored dye layer of such a black colored dye-donor element are described in e.g. European patent application no. 92202157.1, EP 453020, U.S. Pat. No. 4,816,435 and JP 01/136787.

One important application of recording monochrome black images by thermal dye sublimation transfer is the recording on transparent film receiver of hard copies of medical diagnostic images obtained by e.g. ultrasound techniques. Such a hard copy is seen as a more ecologically acceptable and more convenient substitute for the black-and-white silver hard copy obtained by developing conventional photographic silver halide film materials where a lot of silver salt containing processing solution has to be treated carefully before disposal.

To be a real valid substitute for conventional photographic silver halide materials the black colored mixture of organic dyestuffs used in thermal dye sublimation transfer printing should behave visually as black silver.

In the medical world, physicians and radiologists use to evaluate their röntgenograms or other images on a light box or negatoscope. These light boxes contain fluorescent lamps as light source. Contrary to incandescent lamps such as tungsten, where the spectral emission is continuous over the whole range of the visual spectrum, the emission of fluorescent lamps depends on the phosphors used in the fluorescent lamp, said phosphors having peak emissions. As a result fluorescent lamps do not show a continuous emission spectrum. Furthermore, there is no standardization in the type of fluorescent lamp used in said negatoscopes.

There is not so much a problem when viewing classical medical images composed of silver metal on the light boxes, the spectral absorption characteristics of silver being constant over the whole visible spectrum. The hue of the silver image does not change whatever the spectral properties of the light source with which the image is viewed.

But when the black image is composed of colored dyes, the spectral absorption characteristics of organic dyestuffs not being constant over the whole range of the visible spectrum, problems of hue changes arise. A black colored dye mixture looking neutrally when viewed with one light source will no longer do so when viewed with a spectrally different light source. This phenomenon of hue change of an image when viewed with a different light source is highly unwanted, especially when evaluating medical diagnostic images.

This hue change can also depend on the density of the image, for example, a rather small hue change in the low density areas and a greater hue change in the high density areas.

The phenomenon of two samples (e.g. metallic silver and a black colored mixture of dyes) that match each other in color but are different in spectral composition is also referred to in literature as metamerism (see, for example, "Measuring Colour" by R. W. G. Hunt, edited by Ellis Horwood Limited, 1987, Chapter 7, Section 7.3, page 141). The greater the degree of metamerism the greater will be the likelihood that the colours will no longer match one another when the illumination is changed.

It is an object of the present invention to provide black colored dye mixtures with an acceptable degree of metamerism relative to metallic silver.

It is another object of the present invention to provide black colored dye mixtures of which the degree of metamerism relative to metallic silver remains substantially the same over the whole density range.

It is another object of the present invention to provide black colored dye mixtures for recording hard copies of medical diagnostic images by thermal dye sublimation transfer printing that behave visually substantially as metallic silver.

Other objects will become apparent from the description given hereinafter.

SUMMARY OF THE INVENTION

These objects are achieved by using a black colored dye mixture composed of at least four dyes and comprising two dyes having absorption maxima in the spectral range between 470 and 600 nm that are at least 30 nm apart from each other.

In accordance with the present invention an imaging element is provided, said imaging element comprising on a transparent support a black colored dye image, said black colored dye image consisting of a dye mixture comprising two dyes having absorption maxima in the spectral range between 470 and 600 nm that are at least 30 nm apart from each other.

By using a dye mixture according to the present invention black colored dye images are obtained with an acceptable degree of metamerism relative to metallic silver and of which the degree of metamerism remains practically the same over the whole density range, that are valid substitutes for black images obtained from photographic silver halide materials.

DETAILED DESCRIPTION OF THE INVENTION

The given absorption maxima of the respective dyes are the absorption maxima of said dyes as measured on the receiving layer.

In a preferred embodiment of the present invention the said black colored dye mixture contains a magenta dye having an absorption maximum in the spectral range between 500 and 600 nm, a cyan dye having an absorption maximum in the spectral range between 600 and 700 nm, a yellow dye having an absorption maximum in the spectral range between 400 and 470 nm and at least one other dye having an absorption maximum in the spectral range between 470 and 600 nm that is at least 30 nm distant from the absorption maximum of the said magenta dye.

With such a dye mixture of only four dyes black colored images are obtained with an acceptable degree of metamerism with metallic silver.

Magenta dyes to be used in the dye mixture according to the present invention include magenta azo dyes as described in EP 216483 (heterocyclic azo aniline dyes) and EP 235939 (arylazoaniline dyes with electron withdrawing substituents on the aryl nucleus), tricyanovinylaniline dyes as described in U.S. Pat. No. 4,159,192 and anthrachinon dyes as described in EP 209990. Suitable magenta dyes are Dye 1 to Dye 23 and M1 to M20 described in EP 453020, the magenta dyes listed in table 4 of European patent application no, 92202157.1 and the magenta dyes described in European patent application no. 92202156.3.

Especially preferred magenta dyes are the magenta thiazolylazoaniline dyes described in EP 453020 and in European patent application no. 92202156.3, which are incorporated herein by reference. Said magenta dyes have ideal spectral characteristics (broad absorption spectra), high tinctorial strength and high optical densities on printing, as described in EP 453020. Such magenta dyes correspond to the following general formula (I)

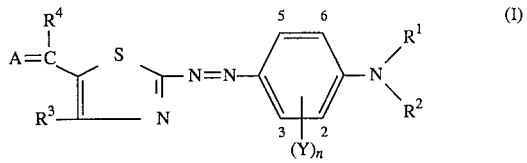

wherein

A represents O, N—$R^5$, $CR^6R^7$;

Y represents any substituent, e.g. SH, OH, halogen, $NO_2$, CN, alkyl, aryl, amino, carbonamido, sulfonamido, acylamino, alkoxy, thioalkoxy;

n represents 0, 1, 2, 3 or 4, the Y substituents being the same or different when n is greater than 1;

each of $R^1$ to $R^2$ (same or different) represent hydrogen, an alkyl group, a cycloalkyl group or an aryl group, which groups may be substituted, or $R^1$ and $R^2$ may be joined together to form a 5- or 6-membered heterocyclic ring system which may be substituted, or each of $R^1$ and $R^2$ independently can be joined to the carbon atom of the aromatic ring at a position ortho to the position of attachment of the anilino nitrogen to form a 5- or 6-membered ring, which ring may be substituted;

$R^3$ represents a substituent, preferentially halogen, $OR^{10}$, $SR^{10}$;

$R^4$ represents hydrogen or an electron withdrawing substituent e.g. CN, halogen, nitro, alkoxycarbonyl, alkylcarbonyl;

$R^5$ represents H, CN, $NR^8R^9$, $OR^8$, $OCOR^8$, $OCOOR^8$, $OCONR^8R^9$, $OSO_2R^8$, $OPO(OR^8)(OR^9)$;

$R^6$ and $R^7$ (same or different) represent an electron withdrawing group such as CN, $CO_2R^8$, $CONR^8R^9$, $NO_2$, $COR^8$, $PO(OR^8)(OR^9)$, $SO_2R^8$, $SO_3R^8$;

$R^8$ and $R^9$ (same or different) represent hydrogen, substituted or unsubstituted alkyl, substituted or unsubstituted aryl, substituted or unsubstituted cycloalkyl or $R^8$ and $R^9$ together represent the atoms necessary for completing a heterocyclic nucleus or substituted heterocyclic nucleus;

$R^{10}$ represents hydrogen, substituted or unsubstituted alkyl, substituted or unsubstituted cycloalkyl, substituted or unsubstituted aryl.

Preferably $R^1$ and $R^2$ represent an alkyl group (e.g. butyl, ethyl, hexyl), $R^3$ represents halogen (e.g. chlorine) or alkoxy (e.g. methoxy), $R^4$ represents hydrogen or cyano, A represents O or $CR^6R^7$ with $R^6$ representing CN and $R^7$ representing alkoxycarbonyl or amido, n represents 0 or 1 with Y representing alkyl or alkoxy or halogen or alkylsulfonamino or alkylcarbonylamino or arylsulfonylamino generally in the 3-position.

Examples of preferred magenta dyes are listed hereinafter together with their absorption maxima on a polyvinylchloride type receiving layer.

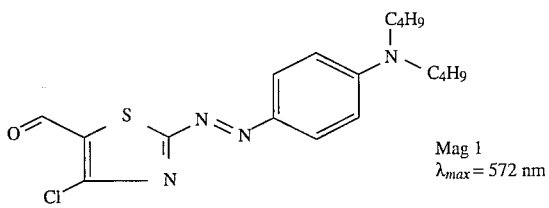

Mag 1
$\lambda_{max} = 572$ nm

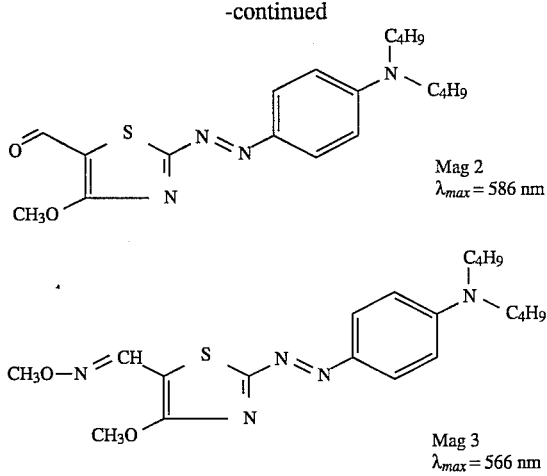

Mag 2
$\lambda_{max} = 586$ nm

Mag 3
$\lambda_{max} = 566$ nm

Cyan dyes to be used in the dye mixture according to the present invention include the cyan indoaniline dyes and cyan azo dyes as described in European patent application no. 92202155.5 and cyan anthrachinon dyes. Indoaniline dyes of the general formula (II) as described in European patent application no. 92202157.1, incorporated herein by reference, are preferred due to their favourable influence on catalytic fotofading (as described in e.g. European patent applications nos 92202155.5 and 92202157.1).

Examples of preferred cyan dyes are listed hereinafter together with their absorption maxima measured on a polyvinylchloride type receiving layer.

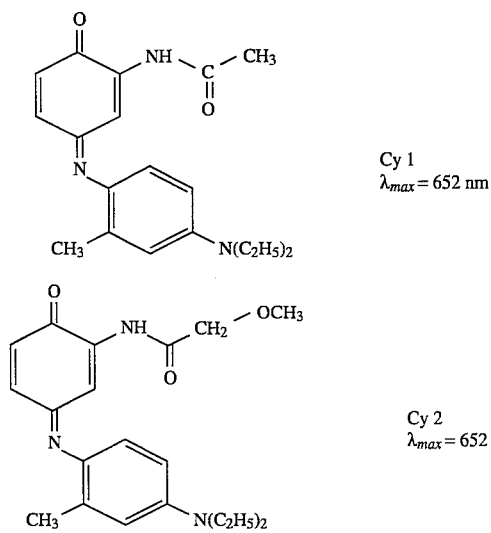

Cy 1
$\lambda_{max} = 652$ nm

Cy 2
$\lambda_{max} = 652$ nm

Yellow dyes to be used in the dye mixture according to the present invention include the yellow dyes described in EP 400706, EP 432829, EP 432313, EP 432314, U.S. Pat. No. 4,816,435, U.S. Pat. No. 4,833,123, which are incorporated herein by reference and pyridone azo dyes as described in EP 247737 and EP 302627 which are incorporated herein by reference. Preferred yellow dyes are the ortho-hydroxy substituted arylazoaniline dyes described in EP 432829 and the dicyanovinylaniline dyes corresponding to general formula (III) as described in European patent application no. 92202157.1, incorporated herein by reference.

Examples of preferred yellow dyes are listed hereinafter together with their absorption maxima as measured on a polyvinylchloride type receiving layer.

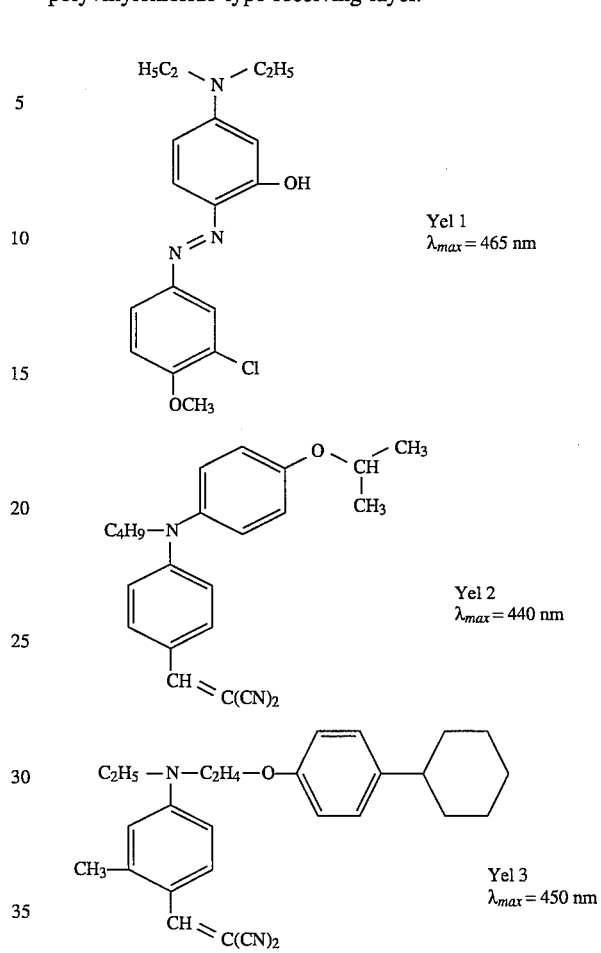

Yel 1
$\lambda_{max} = 465$ nm

Yel 2
$\lambda_{max} = 440$ nm

Yel 3
$\lambda_{max} = 450$ nm

The dye having an absorption maximum in the spectral range between 470 and 600 nm that is at least 30 nm distant from the absorption maximum of the magenta dye for use in the black colored dye mixture of the present invention include orange to red azo dyes as described in EP 235939 and yellow to orange colored bis(N,N-disubstituted aniline) azo dyes as described in European patent application no. 92202157.1. Preferred types of said dye are the yellow to orange colored bis(N,N-disubstituted aniline) azo dyes described in European patent application no. 92202157.1 (incorporated herein by reference) corresponding to the following formula

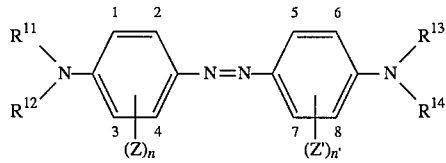

wherein
each of $R^{11}$ to $R^{14}$ (same or different) represent hydrogen, an alkyl group, a cycloalkyl group or an aryl group, which groups may be substituted, or $R^{11}$ and $R^{12}$ and/or $R^{13}$ and $R^{14}$ may be joined together to form a 5- or 6-membered heterocyclic ring system which may be substituted, or each of $R^{11}$ to $R^{14}$ independently can be joined to the carbon atom of the aromatic ring at a position ortho to the position of attachment of the anilino nitrogen to form a 5- or 6-membered ring, which ring may be substituted;

Z and Z' (same or different) represent any substituent, e.g. SH, OH, halogen, $NO_2$, CN, alkyl, amino (subsituted or not), carbonamido, sulfonamido, acylamino, sulfonylamino, phosphorylamino, alkoxy, thioalkoxy, alkoxycarbonyl, aryloxycarbonyl;

n and n' (same or different) represent 0, 1, 2, 3 or 4, the Z and Z' substituents respectively may be the same or different when n or n' respectively is greater than 1.

Preferably $R^{11}$ to $R^{14}$ (same or different) represent an alkyl group (e.g. ethyl, butyl), Z represents hydroxy, amino, acylamino, alkoxy, sulfonylamino, phosphorylamino, carbonamido or sulfonamido, generally in the 4-position, n represents 0 or 1 and n' represents 0.

Examples of preferred dyes according to the present invention having an absorption maximum in the spectral range between 470 and 600 nm that is at least 30 nm distant from the absorption maximum of the magenta dye include

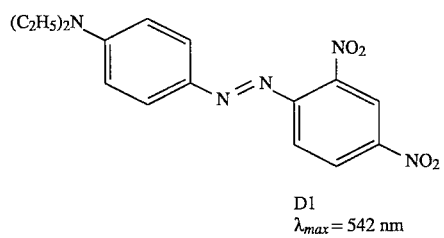

D1
$\lambda_{max}$ = 542 nm

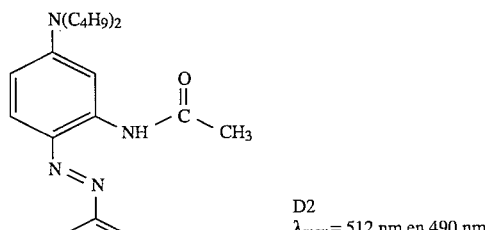

D2
$\lambda_{max}$ = 512 nm en 490 nm

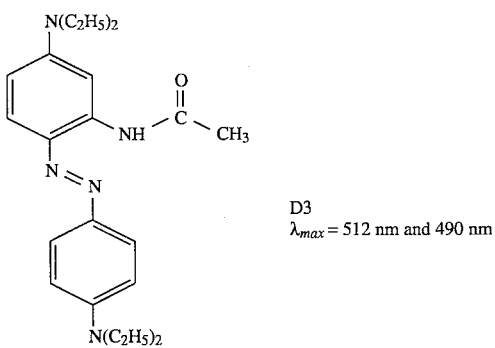

D3
$\lambda_{max}$ = 512 nm and 490 nm

Preferably the absorption maximum of the said other dye is situated approximately in the middle between the absorption maximum of the magenta dye and the absorption maximum of the yellow dye.

In the black colored dye mixture of the present invention one of said magenta dyes, one of said cyan dyes, one of said yellow dyes and one of said other dyes can be used. Alternatively the black colored dye mixture of the present invention can contain for the magenta and/or cyan and/or yellow and/or said other dye a mixture of two or more of said respective colored dyes.

A preferred black colored dye mixture according to the present invention comprises Mag 2, Mag 3, Cy 2, Yel 3 and D3.

The respective dyes are contained in the mixture of the present invention in such a compounding ratio to obtain a neutrally black colored mixture.

The compounding ratio of the dyes in the black colored dye mixture according to the present invention depends upon the types of dyes used and is properly from 10 to 40% by weight for the yellow dye, from 10 to 40% by weight for the cyan dye, from 10 to 40% by weight for the magenta dye and from 5 to 40% for the said other dye having an absorption maximum between 470 and 600 nm that is at least 30 nm distant from the absorption maximum of the magenta dye.

According to a preferred embodiment of the present invention said black colored dye mixture is used in thermal dye diffusion transfer printing to obtain a black colored dye image on a transparant receiver sheet.

The respective compounding colored dyes of the dye mixture of the present invention can then be contained in respective different colored dye areas (magenta, cyan and yellow) of the dye-donor element or in one and the same black colored dye-donor element, this latter embodiment being preferred.

The dye layer of such a dye-donor element is formed preferably by adding the dyes, the polymeric binder medium, and other optional components to a suitable solvent or solvent mixture, dissolving or dispersing the ingredients to form a coating composition that is applied to a support, which may have been provided first with an adhesive or subbing layer, and dried.

The dye layer thus formed has a thickness of about 0.2 to 5.0 μm, preferably 0.4 to 2.0 μm, and the amount ratio of dye to binder is between 9:1 and 1:3 by weight, preferably between 3:1 and 1:2 by weight.

As polymeric binder the following can be used: cellulose derivatives, such as ethyl cellulose, hydroxyethyl cellulose, ethylhydroxy cellulose, ethylhydroxyethyl cellulose, hydroxypropyl cellulose, methyl cellulose, nitrocellulose, cellulose acetate formate, cellulose acetate hydrogen phthalate, cellulose acetate, cellulose acetate propionate, cellulose acetate butyrate, cellulose acetate pentanoate, cellulose acetate benzoate, cellulose triacetate; vinyl-type resins and derivatives, such as polyvinyl alcohol, polyvinyl acetate, polyvinyl butyral, copolyvinyl butyral-vinyl acetal-vinyl alcohol, polyvinyl pyrrolidone, polyvinyl acetoacetal, polyacrylamide; polymers and copolymers derived from acrylates and acrylate derivatives, such as polyacrylic acid, polymethyl methacrylate and styreneacrylate copolymers; polyester resins; polycarbonates; copolystyrene-acrylonitrile; polysulfones; polyphenylene oxide; organosilicones, such as polysiloxanes; epoxy resins and natural resins, such as gum arabic. Preferably cellulose acetate butyrate or copolystyrene-acrylonitrile is used as binder for the dye layer of the present invention.

The coating layer may also contain other additives, such as curing agents, preservatives, organic or inorganic fine particles, dispersing agents, antistatic agents, defoaming agents, viscosity controlling agents, etc., these and other ingredients being described more fully in EP 133011, EP 133012, EP 111004 and EP 279467.

Especially preferred organic fine particles for use in the dye layer are polyethylene, polypropylene, or amide wax particles.

Any material can be used as the support for the dye-donor element provided it is dimensionally stable and capable of withstanding the temperatures involved, up to 400° C. over a period of up to 20 msec, and is yet thin enough to transmit heat applied on one side through to the dye on the other side to effect transfer to the receiver sheet within such short periods, typically from 1 to 10 msec. Such materials include polyesters such as polyethylene terephthalate, polyamides, polyacrylates, polycarbonates, cellulose esters, fluorinated polymers, polyethers, polyacetals, polyolefins, polyimides, glassine paper and condenser paper. Preference is given to a support comprising polyethylene terephthalate. In general, the support has a thickness of 2 to 30 µm.

The support may also be coated with an adhesive or subbing layer, if desired. A suitable subbing layer contains a copolyester of terephthalic acid, isophthalic acid, ethylene glycol and neopentylglycol and optionally 1,2-dihydroxybenzene. Alternatively polyester subbing layers such as described in European patent application no. 92200907.1 are used.

The dye layer of the dye-donor element may be coated on the support or printed thereon by a printing technique such as a gravure process.

A dye-barrier layer comprising a hydrophilic polymer may also be employed in the dye-donor element between its support and the dye layer to improve the dye transfer densities by preventing wrong-way transfer of dye towards the support. The dye barrier layer may contain any hydrophilic material which is useful for the intended purpose. In general, good results have been obtained with gelatin, polyacryl amide, polyisopropyl acrylamide, butyl methacrylate grafted gelatin, ethyl methacrylate grafted gelatin, ethyl acrylate grafted gelatin, cellulose monoacetate, methyl cellulose, polyvinyl alcohol, polyethylene imine, polyacrylic acid, a mixture of polyvinyl alcohol and polyvinyl acetate, a mixture of polyvinyl alcohol and polyacrylic acid or a mixture of cellulose monoacetate and polyacrylic acid. Suitable dye barrier layers have been described in e.g. EP 227091 and EP 228065. Certain hydrophilic polymers, for example those described in EP 227091, also have an adequate adhesion to the support and the dye layer, thus eliminating the need for a separate adhesive or subbing layer. These particular hydrophilic polymers used in a single layer in the donor element thus perform a dual function, hence are referred to as dye-barrier/subbing layers.

Preferably the reverse side of the dye-donor element is coated with a slipping layer to prevent the printing head from sticking to the dye-donor element. Such a slipping layer would comprise a lubricating material such as a surface active agent, a liquid lubricant, a solid lubricant or mixtures thereof, with or without a polymeric binder. The surface active agents may be any agents known in the art such as carboxylates, sulfonates, phosphates, aliphatic amine salts, aliphatic quaternary ammonium salts, polyoxyethylene alkyl ethers, polyethylene glycol fatty acid esters, fluoroalkyl $C_2$—$C_{20}$ aliphatic acids. Examples of liquid lubricants include silicone oils, synthetic oils, saturated hydrocarbons and glycols. Examples of solid lubricants include various higher alcohols such as stearyl alcohol, fatty acids and fatty acid esters. Suitable slipping layers are described in e.g. EP 138483, EP 227090, U.S. Pat. No. 4,567,113, U.S. 4,572,860, U.S. Pat. No. 4,717,711. Preferably the slipping layer comprises as binder a styrene-acrylonitrile copolymer or a styrene-acrylonitrile-butadiene copolymer or a mixture hereof or a polycarbonate as described in European patent application no. 91202071.6 and as lubricant in an amount of 0.1 to 10 % by weight of the binder (mixture) a polysiloxane-polyether copolymer or polytetrafluoroethylene or a mixture hereof.

In a preferred embodiment the reverse side of the support is coated with the following subsequent layers in order to prevent sticking from the dye-donor element to the thermal head: a subbing layer, a heat-resistant layer and a toplayer. Suitable subbing layers can be choosen from the classes of polyester resins, polyurethane resins, polyester urethane resins, modified dextrans, modified cellulose, and copolymers comprising recurring units such as i.a. vinylchloride, vinylidenechloride, vinylacetate, acrylonitrile, methacrylate, acrylate, butadiene and styrene (e.g. poly(vinylidenechloride-co-acrylonitrile)). Especially preferred are polyester subbing layers such as described in European patent application no. 92200907.1. Suitable heat-resistant layers are described in European patent applications nos 91202071.6 (polycarbonates) and 92201619.1 (polyethers). The separate toplayer comprises at least one lubricant e.g. a polyether-polysiloxane copolymer.

The support for the receiver sheet that is used with the dye-donor element is a transparant film of e.g. polyethylene terephthalate, a polyether sulfone, a polyimide, a cellulose ester or a polyvinyl alcohol-co-acetal. Blue-colored polyethylene terephthalate film can also be used as transparant support.

To avoid poor adsorption of the transferred dye to the support of the receiver sheet this support must be coated with a special surface, a dye-image-receiving layer, into which the dye can diffuse more readily. The dye-imaging-receiving layer may comprise, for example, a polycarbonate, a polyurethane, a polyester, a polyamide, polyvinyl chloride, polystyrene-co-acrylonitrile, polycaprolactone or mixtures thereof. The dye-image receiving layer may also comprise a heat-cured product of Poly(vinylchloride-co-vinylacetate-co-vinylalcohol) and polyisocyanate. Suitable dye-receiving layers have been described in e.g. EP 133011, EP 133012, EP 144247, EP 227094, EP 228066.

In order to improve the light resistance and other stabilities of recorded images, UV absorbers, singlet oxygen quenchers such as HALS-compounds (Hindered Amine Light Stabilizers) and/or antioxidants may be incorporated into the receiving layer.

The dye layer of the dye-donor element or the dye-image-receiving layer of the receiver sheet may also contain a releasing agent that aids in separating the dye-donor element from the dye-receiving element after transfer. The releasing agents can also be applied in a separate layer on at least part of the dye layer or of the receiving layer. For the releasing agent solid waxes, fluorine- or phosphate-containing surfactants and silicone oils are used. Suitable releasing agents are described in e.g. EP 133012, JP 85/19138, EP 227092.

The dye-donor el ements and receiver sheets according to the invention are used to form a black colored dye transfer image. Such a process comprises placing the dye layer of the donor element in face-to-face relation with the dye-receiving layer of the receiver sheet and imagewise heating from the back of the donor element. The transfer of the dye is accomplished by heating for about several milliseconds at a temperature of 400° C.

When a dye-donor element having a black colored dye layer is used the process is performed only once. When a donor element containing three or more primary colored dye areas is used the process steps described above are performed sequentially for each dye area. The above sandwich of donor element and receiver sheet is formed on three occasions during the time when heat is applied by the thermal printing head. After the dyes from the first dye area have been transferred, the elements are peeled apart. Another area of the donor element is then brought in register with the dye-receiving element and the process repeated. The dyes from the third dye area and optionally further dye areas are transferred in the same manner.

In addition to thermal heads, laser light, infrared flash or heated pens can be used as the heat source for supplying heat energy. Thermal printing heads that can be used to transfer dye from the dye-donor element to the receiver sheet are commercially available. In case laser light is used, the dye layer or another layer of the dye element has to contain a compound that absorbs the light emitted by the laser and converts it into heat, e.g. carbon black.

Alternatively, the support of the dye-donor element may be an electrically resistive ribbon consisting of, for example, a multi-layer structure of a carbon loaded polycarbonate coated with a thin aluminum film. Current is injected into the resistive ribbon by electrically adressing a print head electrode resulting in highly localized heating of the ribbon beneath the relevant electrode. The fact that in this case the heat is generated directly in the resistive ribbon and that it is thus the ribbon that gets hot leads to an inherent advantage in printing speed using the resistive ribbon/electrode head technology compared to the thermal head technology where the various elements of the thermal head get hot and must cool down before the head can move to the next printing position.

The black colored dye mixtures of the present invention can also be used in other thermal imaging techniques. Such techniques include the thermal transfer printing whereby a receiving sheet containing a mixture of dye progenitors and a donor element containing a reagent for the dye progenitors is used, for instance a diffusible organic acid in the case of basic leuco dyes or a diffusible organic base in the case of acid dye precursors, or an oxidant or reductant in the case of redox dye precursors, depending on their redox state. Instead of a combination of a donor and receiving element there may also be used a so-called self-contained material or monosheet, where the dye precursors and reagents are contained in one sheet and the whole system can be activated by applying image-wise heat, again by means of a thermal head or laser, when the sheet is provided with an infrared absorbing material.

The black colored dye mixture of the present invention can also be used in ink-jet printing.

The following examples are provided to illustrate the invention in more detail without limiting, however, the scope thereof.

EXAMPLE 1

A black colored dye-donor element for use according to thermal dye diffusion transfer was prepared as follows.

A solution comprising 3 wt % of Mag 2, 4 wt % of Mag 3, 4.5 wt % of Cy 2, 4 wt % of Yel 3 and 2 wt % of D3 and 8 wt % of poly(styrene-co-acrylonitrile) as binder in methyl ethyl ketone as solvent was prepared. From this solution a dye layer having a wet thickness of 100 μm was coated on a 6 μm thick polyethylene terephthalate film support provided with a conventional subbing layer. The resulting dye layer was dried by evaporation of the solvent.

The opposite side of the film support was coated with a subbing layer of a copolyester comprising ethylene glycol, adipic acid, neopentyl glycol, terephthalic acid, isophthalic acid and glycerol. On top of this subbing layer, a heat-resistant layer was coated from methylethylketone, containing 0.5 g/m² of a polycarbonate having the following structure:

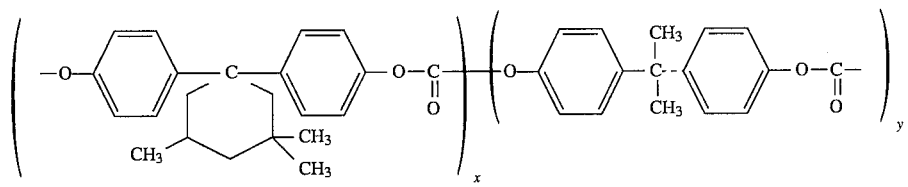

wherein x=55 mol % and y=45 mol %.

On top of said polycarbonate layer, a topcoat layer of polyether modified polydimethylsiloxane (Tegoglide 410, Goldschmidt) was applied from isopropanol.

A receiver sheet for use according to thermal dye sublimation transfer printing was prepared as follows:

A 175 μm thick polyethylene terephthalate film was coated from methylethylketone with a dye image receiving layer which contains 3.6 g/m² poly(vinylchloride-co-vinylacetate-co-vinylalcohol) (Vinylite VAGD supplied by Union Carbide), 0.336 g/m² diisocyanate (Desmodur VL supplied by Bayer AG) and 0.2 g/m² hydroxy modified polydimethylsiloxane (Tegomer HSI 2111 supplied by Goldschmidt).

The dye-donor element was printed in combination with the receiving sheet in a Mitsubishi colour video printer CP100E.

The receiver sheet was separated from the dye-donor element.

The colour difference of the obtained black dye image caused by substituting a test illuminant for a reference illuminant of different spectral composition was measured and calculated at various densities using the CIELAB colour-difference formulae as described in "Measuring Colour", edited by Ellis Horwood Limited, 1987, Chapter 3, Section 3.10, page 66. The colour difference is expressed as $\Delta E$ and is equal to $((\Delta L)^2+(\Delta a)^2+(\Delta b)^2)^{0.5}$. As reference illuminant the CIE Standard Illuminant A is used (see "Measuring Colour" (the particulars of which are described hereinbefore), Chapter 5, Section 5.3, page 106). As test illuminant fluorescent lamp F5 is used (due to its similarity with the lamps frequently used in negatoscopes) as defined in "Measuring Colour" (the particulars of which are described hereinbefore), Appendix 5, Section A5.3, page 189. The results are listed in Table 1 below.

TABLE 1

| density | illuminant A | | | illuminant F5 | | | ΔE |
|---|---|---|---|---|---|---|---|
| | L | a | b | L | a | b | |
| 0.49 | 63.34 | −2.64 | −6.96 | 63.56 | −3.982 | −5.211 | 2.22 |
| 0.86 | 43.90 | −3.30 | −9.38 | 44.23 | −5.598 | −6.972 | 3.30 |
| 1.34 | 25.63 | −3.35 | −10.53 | 25.89 | −6.211 | −7.863 | 3.92 |
| 1.97 | 9.59 | −2.31 | −9.96 | 9.769 | −5.356 | −7.645 | 3.83 |

The same experiment was repeated using a commercially available black colored dye-donor element type XL300B supplied by Kodak and a commercially available receiver sheet type XL100-8T supplied by Kodak. The results are listed in Table 2.

TABLE 2

| density | illuminant A | | | illuminant F5 | | | ΔE |
|---|---|---|---|---|---|---|---|
| | L | a | b | L | a | b | |
| 0.41 | 68.82 | −4.56 | −2.67 | 69.38 | −0.682 | −2.132 | 3.95 |
| 0.67 | 53.59 | −5.85 | −4.58 | 54.32 | −0.39 | −3.998 | 5.54 |
| 1.01 | 37.63 | −6.30 | −6.62 | 38.43 | 0.295 | −6.121 | 6.08 |
| 1.28 | 27.34 | −5.85 | −7.59 | 28.1 | 0.994 | −7.267 | 4.93 |

The same experiment was repeated using a commercially available black colored dye-donor element type CK100BS supplied by Mitsubishi and a commercially available receiver sheet type CK100TS supplied by Mitsubishi. The results are listed in Table 3.

TABLE 3

| density | illuminant A | | | illuminant F5 | | | ΔE |
|---|---|---|---|---|---|---|---|
| | L | a | b | L | a | b | |
| 0.40 | 69.15 | 0.66 | −4.60 | 68.85 | −3.335 | −2.659 | 4.45 |
| 0.83 | 45.38 | 1.31 | −8.50 | 44.88 | −6.008 | −5.146 | 8.07 |
| 0.91 | 41.60 | 1.51 | −8.88 | 41.05 | −6.46 | −5.278 | 8.76 |
| 0.94 | 40.48 | 1.71 | −8.85 | 39.9 | −6.544 | −5.23 | 9.03 |

The colour differences when changing illuminant A by illuminant F5 were also calculated for metallic silver. The results are given in Table 4.

TABLE 4

| density | illuminant A | | | illuminant F5 | | | ΔE |
|---|---|---|---|---|---|---|---|
| | L | a | b | L | a | b | |
| 0.2 | 81.26 | −1.25 | −0.79 | 81.4 | −0.525 | −0.616 | 0.76 |
| 0.71 | 51.33 | −1.77 | −1.39 | 51.5 | −0.575 | −1.25 | 1.22 |
| 1.18 | 30.73 | −1.69 | −1.11 | 30.9 | −0.506 | −1.02 | 1.20 |
| 1.69 | 15.66 | −1.35 | −0.48 | 15.8 | −0.48 | −0.34 | 0.89 |
| 2.09 | 7.32 | −0.84 | −0.15 | 7.42 | −0.23 | −0.071 | 0.62 |

From table 4 it can be seen that the colorimetric changes occuring when a metallic silver image is viewed with spectrally different illuminants are very small and can be neglected (a colour difference of less than 2 (ΔE) is hardly discernable for the human eye). Therefore when a color dye mixture matches a metallic silver image with a given illuminant the mismatch occuring when the illuminant is changed can be said to be due nearly completely to the change in visual appearance of the color dye mixture. Hence the CIELAB colour differences mentioned above can be equated to the Illuminant Metamerism Index M as defined in "Measuring Colour" (the particulars of which are given hereinbefore), Chapter 7, Section 7.3, page 141.

It is clear from this results that dye mixtures according to the present invention used in thermal dye diffusion transfer printing have an acceptable degree of metamerism with metallic silver in contrast with commercially available thermal dye diffusion transfer materials. Further the degree of metamerism does not change very much with the density again in contrast with commercially available materials.

Thus dye mixtures according to the present invention used in thermal dye sublimation transfer printing behave visually substantially as metallic silver and therefore hard copies of medical diagnostic images obtained by thermal dye transfer sublimation printing using a dye mixture according to the present invention are valid substitutes for hard copies obtained from conventional silver halide photographic materials.

EXAMPLE 2

The proportion in a mixture of a magenta, a cyan and a yellow dye (the nature of the dyes is defined hereinafter) required to obtain a neutral black of a visual density of 1.5 with illuminant A is calculated according to the formulae described in "Calculating the Color Gamut of Materials from the Colorant Spectra", Lasers in Graphics/Electronic Design, Print 90 Conference Proceedings, Volume II, page 127. The quantity of dye required to give a density of 1 at the absorption maximum of the dye has been chosen as unity.

The colour difference (ΔE) for this mixture occurring when the illuminant A is changed by another illuminant (F1 to F12 as defined in "Measuring Colour" (the particulars of which are given hereinbefore), Appendix A5.3) is calculated.

Since F5 matches fairly well the light source found in a number of commercially available lightboxes ΔE for F5 is given in the following tables. Further the mean value of ΔE for F1 to F12 is also given in the following tables.

Then increasing quantities of a dye according to the present invention having an absorption maximum in the spectral range between 470 and 600 nm that is at least 30 nm distant from the absorption maximum of the magenta dye used in the mixture is added to the dye mixture. This addition to the aforementioned mixture of yellow, magenta and cyan dyes implies an adaptation of the amounts of those dyes in order to keep the new mixture neutral black with the original illuminant. The proportion of the four color dyes in this new mixture is therefore calculated according to the formulae described in "Calculating the Color Gamut of Materials from the Colorant Spectra", Lasers in Graphics/Electronic Design, Print 90 Conference Proceedings, Volume II, page 127.

For each of these new mixtures the colour difference for a set of illuminants (F1 to F12) spectrally differing from the original illuminant A is calculated.

The results are given in the tables hereinafter.

TABLE 5

| Yel 1 | Mag 1 | Cy 1 | D1 | ΔE for F5 | ΔE mean for F1 to F12 |
|---|---|---|---|---|---|
| 1.66 | 1.63 | 0.73 | 0 | 11.76 | 10.18 |
| 1.59 | 1.31 | 0.83 | 0.24 | 9.43 | 8.59 |
| 1.54 | 1.10 | 0.90 | 0.40 | 7.96 | 7.59 |
| 1.48 | 0.83 | 0.99 | 0.61 | 6.29 | 6.46 |
| 1.45 | 0.67 | 1.05 | 0.74 | 5.43 | 5.88 |

TABLE 6

| Yel 1 | Mag 1 | Cy 1 | D2 | ΔE for F5 | ΔE mean for F1 to F12 |
|---|---|---|---|---|---|
| 1.66 | 1.63 | 0.73 | 0 | 11.76 | 10.18 |
| 1.48 | 1.46 | 0.83 | 0.24 | 8.56 | 8.64 |
| 1.33 | 1.34 | 0.91 | 0.43 | 6.59 | 7.74 |
| 1.12 | 1.19 | 1.02 | 0.73 | 4.87 | 6.97 |
| 0.97 | 1.10 | 1.10 | 0.94 | 4.65 | 6.8 |

TABLE 7

| Yel 1 | Mag 1 | Cy 1 | D2 | ΔE for F5 | ΔE mean for F1 to F12 |
|---|---|---|---|---|---|
| 3.44 | 1.94 | 0.56 | 0 | 31.9 | 19.0 |
| 2.36 | 1.62 | 0.72 | 0.32 | 22.5 | 15.1 |
| 1.89 | 1.46 | 0.82 | 0.51 | 17.1 | 12.6 |
| 1.42 | 1.29 | 0.94 | 0.77 | 10.5 | 9.4 |
| 1.17 | 1.19 | 1.03 | 0.95 | 6.7 | 7.3 |

From this results it is clear that adding to a black colored dye mixture of a magenta, a cyan and a yellow dye increasing amounts of a dye having an absorption maximum in the range between 470 and 600 nm that is at least 30 nm distant from the absorption maximum of the magenta dye decreases the colour difference of this mixture when the illuminant is changed.

The same experiment was done but instead of adding increasing amounts of a dye having an absorption maximum in the range between 470 and 600 nm that is at least 30 nm distant from the absorption maximum of the magenta dye increasing amounts of dyes not having this characteristic was added.

The results are given in the following tables.

TABLE 8

| Yel 1 | Mag 1 | Cy 1 | Yel 3 | ΔE for F5 | ΔE mean for F1 to F12 |
|---|---|---|---|---|---|
| 1.66 | 1.63 | 0.73 | 0 | 11.76 | 10.18 |
| 1.39 | 1.67 | 0.71 | 0.2 | 13.7 | 10.5 |
| 1.22 | 1.71 | 0.69 | 0.4 | 15.4 | 11.0 |
| 1.10 | 1.73 | 0.67 | 0.6 | 17.0 | 11.5 |

TABLE 9

| Yel 1 | Mag 1 | Cy 1 | Yel 2 | ΔE for F5 | ΔE mean for F1 to F12 |
|---|---|---|---|---|---|
| 1.66 | 1.63 | 0.73 | 0 | 11.76 | 10.18 |
| 1.37 | 1.67 | 0.71 | 0.33 | 13.9 | 10.5 |
| 1.18 | 1.70 | 0.69 | 0.57 | 15.9 | 11.0 |
| 0.95 | 1.75 | 0.66 | 0.91 | 18.9 | 12.1 |
| 0.80 | 1.77 | 0.65 | 1.16 | 21.0 | 13.0 |

TABLE 10

| Yel 1 | Mag 1 | Cy 1 | Mag 2 | ΔE for F5 | ΔE mean for F1 to F12 |
|---|---|---|---|---|---|
| 1.66 | 1.63 | 0.73 | 0 | 11.76 | 10.18 |
| 1.65 | 1.40 | 0.71 | 0.23 | 11.50 | 10.0 |
| 1.64 | 1.23 | 0.69 | 0.40 | 11.30 | 9.87 |
| 1.63 | 0.98 | 0.67 | 0.64 | 11.03 | 9.67 |
| 1.62 | 0.82 | 0.66 | 0.80 | 10.85 | 9.54 |

These results show that adding yellow dyes having absorption maxima outside the range of 470–600 nm (tables 8 and 9) or magenta dyes having absorption maxima in the range of 470–600 nm but at less than 30 nm distant from the absorption maximum of the other magenta dye (table 10) does not significantly change the metamerism of the dye mixture or even increases the metamerism.

We claim:

1. Imaged element produced by thermal dye sublimation transfer printing comprising on a transparent support a black colored dye image consisting of a dye mixture comprising at least four dyes, said dye mixture comprising a magenta heterocyclic azo aniline dye having an absorption maximum in the spectral range between 500 and 600 nm, a cyan dye having an absorption maximum in the spectral range between 600 and 700 nm, a yellow dye having an absorption maximum in the spectral range between 400 and 470 nm and at least one other dye having an absorption maximum in the spectral range between 470 and 600 nm that is at least 30 nm distant from the absorption maximum of said magenta heterocyclic azo aniline dye, wherein said at least one other dye has the following general formula

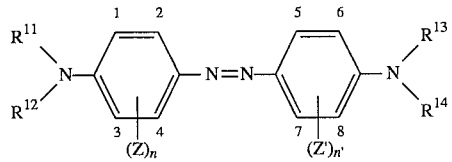

wherein each of $R^{11}$ to $R^{14}$ independently represent hydrogen, an alkyl group, a cycloalkyl group or an aryl group, or $R^{11}$ and $R^{12}$ and/or $R^{13}$ and $R^{14}$ may be joined to form a 5- or 6-membered heterocyclic ring system, or each of $R^{11}$ to $R^{14}$ independently can be joined to the carbon atom of the aromatic ring at a position ortho to the position of attachment of the anilino nitrogen to form a 5- or 6-membered ring;

Z and Z' independently represent any substituent;

n and n' independently represent 0, 1, 2, 3 or 4, the Z and Z' substituents respectively may be the same or different when n or n' respectively is greater than 1.

2. Imaged element according to claim 1 wherein said magenta heterocyclic azo aniline dye is a thiazolylazoaniline dye.

3. Imaged element according to claim 2 wherein said thiazolylazoaniline dye corresponds to the following general formula

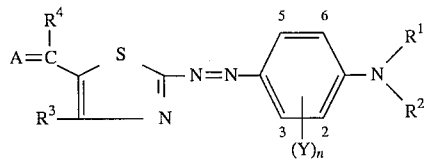

wherein

A represents O, N—$R^5$, $CR^6R^7$;

Y represents —SH, —OH, halogen, —$NO_2$, —CN, alky, aryl, amino, carbonamido, sulfonamido, acylamino, alkoxy. and thioalkoxy;

n represents 0, 1, 2, 3 or 4, the Y substituents being the same or different when n is greater than 1;

each of $R^1$ to $R^2$ independently represent hydrogen, an alkyl group, a cycloalkyl group or an aryl group, or $R^1$ and $R^2$ may be joined together to form a 5- or 6-membered heterocyclic ring system or each of $R^1$ and $R^2$ independently can be joined to the carbon atom of the aromatic ring at a position ortho to the position of attachment of the anilino nitrogen to form a 5- or 6-membered ring;

$R^3$ represents halogen, $OR^{10}$, $SR^{10}$;

$R^4$ represents hydrogen or an electron withdrawing substituent;

$R^5$ represents H, CN, $NR^8R^9$, $OR^8$, $OCOR^8$, $OCOOR^8$, $OCONR^8R^9$, $OSO_2R^8$, $OPO(OR^8)(OR^9)$;

$R^6$ and $R^7$ independently represent an electron withdrawing group;

$R^8$ and $R^9$ independently represent hydrogen, alkyl, aryl, cycloalkyl or $R^8$ and $R^9$ together represent the atoms necessary for completing a heterocyclic nucleus;

$R^{10}$ represents hydrogen, alkyl, cycloalkyl, aryl.

4. Imaged element according to claim 1 wherein said cyan dye is an indoaniline dye.

5. Imaged element according to claim 1 wherein said yellow dye is a dicyanovinylaniline dye.

6. Imaged element according to claim 1 wherein $R^{11}$ to $R^{14}$ independently represent an alkyl group, Z represents hydroxy, amino, acylamino, alkoxy, sulfonylamino, phosphorylamino, carbonamido or sulfonamido, generally in the 4-position, n represents 0 or 1 and n' represents 0.

7. Imaged element according to claim 1, wherein said transparant support is clear polyethylene terephthalate or blue-colored polyethylene terephthalate.

8. Imaged element according to claim 1, wherein said image is a hard copy of a medical diagnostic image.

9. Imaged element according to claim 1, wherein said black colored dye image is obtained by thermal dye sublimation transfer printing.

10. Imaged element according to claim 9, wherein said black colored dye image is contained in a dye-image receiving layer provided on top of the transparent support.

11. Black colored dye-donor element for use according to thermal dye sublimation transfer comprising a support having thereon a dye layer containing a black colored dye mixture said dye mixture comprising at least four dyes, said dye mixture comprising a magenta heterocyclic azo aniline dye having an absorption maximum in the spectral range between 500 and 600 nm, a cyan dye having an absorption maximum in the spectral range between 600 and 700 nm, a yellow dye having an absorption maximum in the spectral range between 400 and 470 nm and at least one other dye having an absorption maximum in the spectral range between 470 and 600 nm that is at least 30 nm distant from the absorption maximum of said magenta heterocyclic azo aniline dye, wherein said at least one other dye has the following general formula

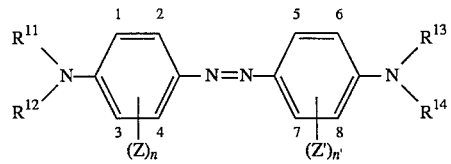

wherein each of $R^{11}$ to $R^{14}$ independently represent hydrogen an alkyl group, a cycloalkyl group or an aryl group, or $R^{11}$ and $R^{12}$ and/or $R^{13}$ and $R^{14}$ may be joined to form a 5- or 6-membered heterocyclic ring system, or each of $R^{11}$ to $R^{14}$ independently can be joined to the carbon atom of the aromatic ring at a position ortho to the position of attachment of the anilino nitrogen to form a 5- or 6-membered ring;

Z and Z' independently represent any substituent;

n and n' independently represent 0, 1, 2, 3 or 4, the Z and Z' substituents respectively may be the same or different when n or n' respectively is greater than 1.

12. Black colored dye-donor element according to claim 11, wherein said dye mixture is dispersed in a polymeric binder.

13. Black colored dye-donor element according to claim 12, wherein said binder is poly(styrene-co-acrylonitrile).

* * * * *